UNITED STATES PATENT OFFICE.

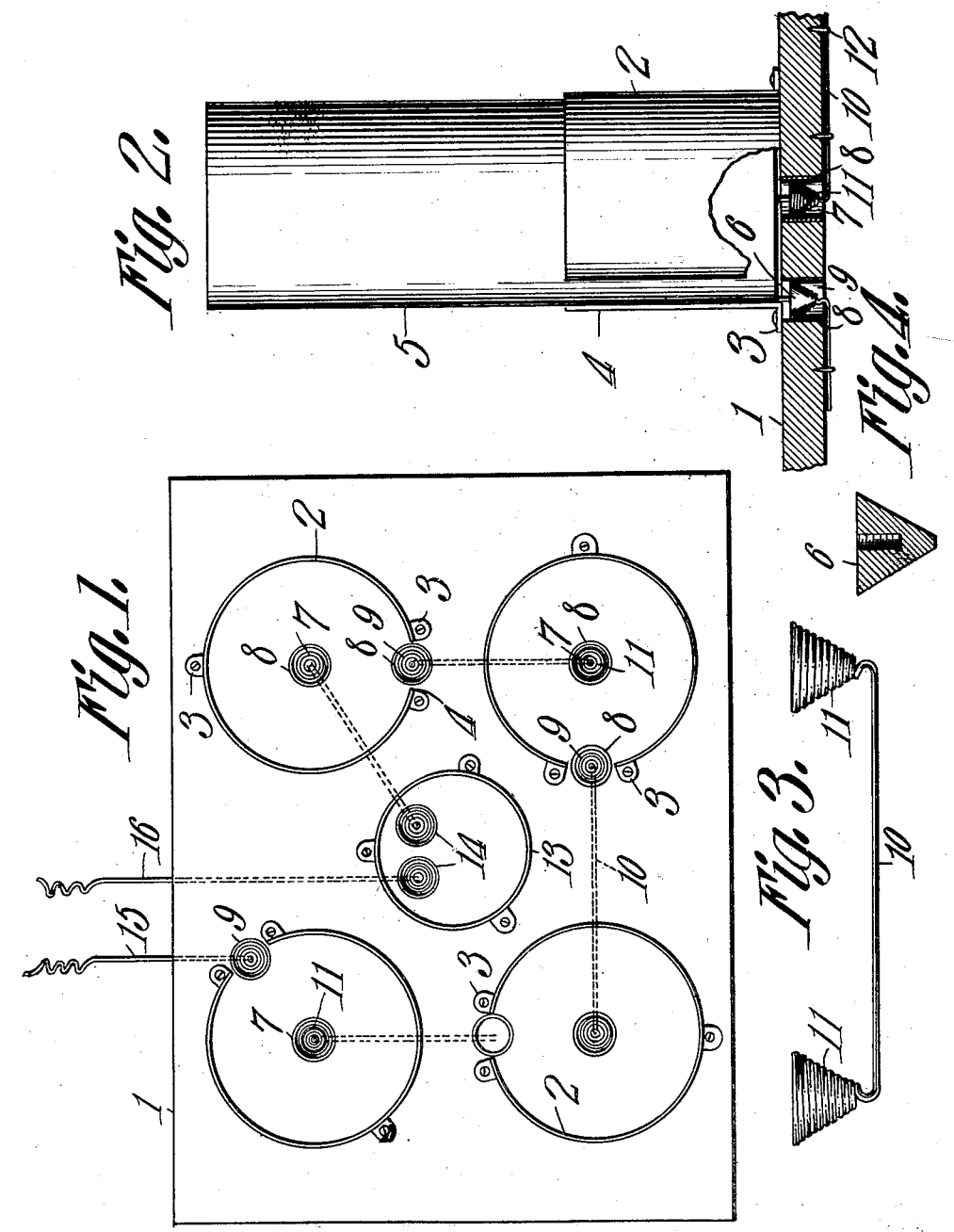

EMORY S. EGGE, OF MONTGOMERY, ALABAMA.

BATTERY-HOLDER.

No. 881,181.  Specification of Letters Patent.  Patented March 10, 1908.

Application filed August 14, 1907. Serial No. 388,535.

*To all whom it may concern:*

Be it known that I, EMORY S. EGGE, a citizen of the United States, residing at Montgomery, in the county of Montgomery and State of Alabama, have invented a new and useful Battery-Holder, of which the following is a specification.

This invention has reference to improvements in battery boxes or holders, and its object is to provide a means whereby battery cells may be properly connected up in circuit by the act of introducing them into the box or holder.

The invention is designed more particularly for use in connection with explosive engines, whether of the stationary type, or marine type, or located upon automobiles.

The present invention consists of a suitable base plate upon which are permanently located sockets or holders of such size as to receive the ends of battery cells of the kind commonly known as dry batteries; that is, these holders are cylindrical to receive cylindrical cells, although if cells of other shape are used the holders may be correspondingly shaped.

Each cell is provided with a terminal plug of such shape as to seat itself in an elastic terminal carried by the base or support and which terminal is connected up in proper sequence to a terminal of another cell or to a terminal of the entire series.

Specifically considered, the terminal plugs are of conical shape while the terminal sockets are in the form of elastic cones made of wire spirals formed at the ends of a connecting strand and suitably located with reference to the battery terminals, so that when the cone plugs are attached to the terminal screws of a battery cell in place of the binding nuts usually employed, these cones will seat themselves and make good contact with the spiral terminals of the connectors, and all that is necessary to couple up the several cells of a series is to introduce them terminal-end downward into the cell holders and the battery terminals will seat themselves in the corresponding ends of the connectors in good electrical contact therewith.

In addition to the cell holders, the base or support also carries a similar holder with similar terminal sockets for the reception of a spark coil of suitable construction, so that the whole structure constitutes an electric unit requiring no other manipulation for use in connection with an explosive engine than the coupling up of the terminals of the unit with the spark plug terminals of the engine.

The invention will be fully understood from the following detailed description, taken in connection with the accompanying drawings forming part of this specification, in which,—

Figure 1 is a plan view of the improved battery box or holder, with the batteries removed; Fig. 2 is a sectional view of the base, with one battery holder in place and one battery cell in circuit; Fig. 3 is a detail view of one of the connectors removed from the supporting board; and Fig. 4 is a detail sectional view of one of the battery terminals.

Referring to the drawings, there is shown a base-board 1, which may be made of wood or any other suitable material, and upon this board are secured a number of cylinders 2 by means of eyes 3 and suitable nails or screws, the cylinders being open at both top and bottom. Along one side the cylinders are split longitudinally and the contiguous ends are separated a distance, as indicated at 4. These cylinders are of such size as to receive and hold snugly battery cells 5, which in the particular structure shown in the drawing are of the cylindrical type of dry cells, while the opening 4 along one side of the cylinders 2 renders the same sufficiently elastic to yield to the insertion of the battery cells and at the same time grasp them so snugly as to prevent the accidental displacement of the cells when once inserted. The cells are thus firmly held in place without fastening devices other than provided by the gripping action of the cylinders 2 upon said battery cells.

In the case of battery cells of other shape, the holders 2 may be made of corresponding shape and will also be made sufficiently elastic to grasp the cells.

In dry cells it is customary to have the carbon element centrally located and the zinc element peripherally located, and it is also customary to have the terminal connections in the shape of screw-rods extending out from the carbon and zinc parallel one to the other and in or parallel to, as the case may be, the longitudinal axis of the cell.

In accordance with the present invention the ordinary binding nuts are removed and a conical nut 6, such as indicated separately in Fig. 4, is screwed on to both the carbon and zinc terminals.

The base-board 1 is provided at points central to the cylinders 2 with through perforations 7 lined with sleeves 8 in case the base-board is made of wood or similar material, these sleeves 8 serving to strengthen the walls of the opening 7. The base-board is also provided with other openings 9, likewise lined with sleeves 8, and these openings are located coincident with the space 4 between the contiguous ends of the split cylinders 2. This brings the openings 7 and 9 in such relation to the cylinders 2 as to receive the conical nuts 6 screwed upon the carbon and zinc terminals, and it is only necessary to introduce the battery cells 5 into the respective cylinders 2 to have the nuts 6 seat themselves in the perforations 7 and 9. The space 4 in the cylinders 2 permits the passage of a block or nut 6 fast on the zinc terminal since this block extends beyond the peripheral surface of the battery cell 5.

In order that the battery terminals may be connected up in proper sequence, there are provided a number of circuit couplings, illustrated separately in Fig. 3. Each of these couplings consists of a conducting strand 10 formed at each end into a cone spiral 11 of such size as to fit into the sleeves 8 in the openings 7 and 9 and projecting from the strand 10 in such direction as to present their wide open ends toward the top of the board or holder 1, the strand 10 being located at the bottom of the board and preferably seated therein where it may be secured by staples 12 or otherwise. The couplings formed by the strands 10 and spirals 11 are so located as to connect the carbon of one cell to the zinc of the next cell in series.

In the particular structure shown in Fig. 1 the unit is adapted to four dry cells and the couplings are disposed to unite these cells in series. Intermediate of the four holders 2 is another holder 13 arranged to receive a spark coil of proper shape and dimensions, but in this case there are two openings, designated at 14, through the board to receive the spirals 11. Since the terminals of the spark coil are usually differently located than are the terminals of the battery cells, the openings 14 are also differently located than are the openings 7 and 9.

Seated in one of the openings 7 or 9 of one of the battery holders 2 is the spiral terminal of a line conductor 15, and seated in one of the openings 14 is the spiral terminal of another line conductor 16, the line conductors extending to the spark plug terminals of the explosive engine, which, of course, is not shown in the drawings.

It will be understood that the conductors 15 and 16 may terminate at binding posts upon the board instead of being extended to the engine.

It will also be understood that the sparking unit herein described may be used in connection with gas lighting outfits, or wherever else it may be adapted.

It will be seen that the spiral terminals 11 of the connectors provide elastic receptacles for the nuts or blocks 6 which tend at all times to hug these blocks tightly, and, therefore, insure good electrical connection, since there is a certain elasticity in the connector terminals which causes them to yield to a slight extent when the nuts 6 are introduced therein and thus the resiliency of these spiral terminals aids in establishing such electrical connections as are most desirable in structures of this type.

I claim:—

1. In a battery box or holder, the combination of a suitable base, elastic receptacles for the battery cells secured to said base, conical terminals for the battery cells, and connectors fast on the base and each terminating in elastic conducting spirals shaped to receive the conical terminals when the latter are attached to the battery cells.

2. A means for coupling electric battery cells comprising battery terminal plugs of conical shape adapted to be secured to the terminals of battery cells, and a coupling conductor having its ends formed into conical spirals to receive the conical battery plugs.

3. An electric sparking unit comprising a suitable base or support, split elastic cylindrical holders secured thereon, coupling connectors extending from the center of one cylinder to a point adjacent the split or divided portion of another cylinder and each connector having its ends formed into conical spirals, conical plugs adapted to be attached to the battery terminals and insertible into the spiral terminals of the connectors, and another cylinder arranged to receive a spark coil and provided within the area covered thereby with spiral connector terminals.

In testimony that I claim the foregoing as my own, I have hereto affixed my signature in the presence of two witnesses.

EMORY S. EGGE.

Witnesses:
  WILLIFORD DUSKIN,
  S. E. WILSON.